United States Patent
Rosas

(10) Patent No.: US 9,737,830 B2
(45) Date of Patent: Aug. 22, 2017

(54) SEPARATION DEVICE FOR THREE-PHASE FLUID, METHOD FOR MAKING THEREOF, AND METHOD FOR SEPARATING A THREE-PHASE FLUID

(71) Applicant: YPF SOCIEDAD ANONIMA, Ciudad Autonoma de Buenos Aires (AR)

(72) Inventor: Ruben Orlando Rosas, Mendoza (AR)

(73) Assignee: YPF SOCIADAD ANONIMA, Ciudad Autonoma de Buenos Aires (AR)

( * ) Notice: Subject to any disclaimer, the term of this patent is extended or adjusted under 35 U.S.C. 154(b) by 311 days.

(21) Appl. No.: 14/689,815

(22) Filed: Apr. 17, 2015

(65) Prior Publication Data
US 2016/0271522 A1 Sep. 22, 2016

(30) Foreign Application Priority Data
Mar. 20, 2015 (AR) ............................... 20150100856

(51) Int. Cl.
*B01D 19/00* (2006.01)
*B01D 17/02* (2006.01)
*B01D 17/12* (2006.01)

(52) U.S. Cl.
CPC .............. *B01D 17/02* (2013.01); *B01D 17/12* (2013.01); *B01D 19/0036* (2013.01); *B01D 19/0068* (2013.01); *B01D 19/0073* (2013.01)

(58) Field of Classification Search
CPC . B01D 19/0068; B01D 17/02; B01D 19/0073
USPC ............................. 96/182, 155, 204; 210/188
See application file for complete search history.

(56) References Cited

U.S. PATENT DOCUMENTS

| | | | |
|---|---|---|---|
| 2,688,368 A * | 9/1954 | Rodgers | E21B 41/02 166/267 |
| 2,984,360 A | 5/1961 | Smith | |
| 3,759,324 A * | 9/1973 | Mecusker | B01D 17/0217 166/267 |
| 5,205,310 A | 4/1993 | Kolpak et al. | |
| 2011/0186134 A1 | 8/2011 | Jacobs et al. | |

FOREIGN PATENT DOCUMENTS

WO        WO 00/51707 A1        9/2000

* cited by examiner

*Primary Examiner* — Robert A Hopkins
(74) *Attorney, Agent, or Firm* — Muncy, Geissler, Olds & Lowe, P.C.

(57) ABSTRACT

A new device and method for separating all phases of a three-phase fluid of the crude oil type, by means of a two-phase fluid separating device provided with a "T" joint for splitting the feed flow. The invention allows the conversion of two-phase separator into a three-phase fluid separating device, updating its functionality, increasing service life, using most of the original parts and components.

15 Claims, 2 Drawing Sheets

SEPARATION DEVICE FOR THREE-PHASE FLUID, METHOD FOR MAKING THEREOF, AND METHOD FOR SEPARATING A THREE-PHASE FLUID

FIELD OF THE INVENTION

The present invention relates to a device for separating the phases of a three-phase fluid of the crude oil type, a method for separating the phases of said fluid, and a method for converting a two-phase fluid separating device into a three-phase fluid separating device.

BACKGROUND OF THE INVENTION

Crude oil and natural gas are usually obtained from underground formations, from which they are extracted through deep perforations. Generally, the fluid obtained from oil deposits consists of a mixture of oil, gas and brine.

Once the crude oil is extracted, along with gas and water, it is sent to batteries or collecting stations where separation of the different fluids and measuring of the volume produced by the different wells are performed.

Usually, two-phase separators are used for a first, gas-liquid separation, so the gas, after eventual dehydration and sweetening, can be sent for its utilization by means of gas pipelines, while the liquid phase containing oil and water can be sent as such by means of oil pipelines or can undergo a first step of separation in treatment plants before being distributed to oil refineries. It is also possible to use horizontal three-phase separators of the Free Water Knock Out (FWKO) for separating under pressure, gas, water and oil. However, such kind of equipment is usually expensive and very complex in design.

For decades, devices and systems for phase separation for the oil industry have been subject of patents, as can be appreciated for example in U.S. Pat. No. 2,984,360, which discloses a device for separating fluids by means of their differences in density, in particular fluids from an oil field. Such device also has a system that uses a floater for detecting the level of liquid.

U.S. Pat. No. 5,205,310 discloses a method for measuring productivity of marginal oil wells which employs a separator, equipped with level sensors. Although said patent focuses mostly on a separator of oil/water phases, presence of gas at the inlet of the separator is also contemplated. Nevertheless, such device has low-efficiency in terms of cost and investment required and its construction is complex. Additionally, such device uses a water cut measuring system in which, if the cut is too high, measuring becomes difficult because of the working range of the equipment used to this end. This is due to the fact that, in the equipment for measuring mass flow, measuring error is at least 5%, and in cases of elevated water cut, which could be over 95%, the reading performed by the equipment falls within the minimal margin of error of the equipment. This renders the measuring very unreliable. For this reason, it is preferable to separate and measure water alone.

Patent application WO 00/51707 A1 discloses a three-phase separator for a mixture containing a gaseous phase and two liquid phases. Such separator includes a "primary separator" in the inlet flow, allowing separation of gas from the liquid phases. Said primary separator can be any gas-liquid separation device (in particular, a Shoepentoeter type valve) which can be placed in the space of the gaseous phase, as can be seen in the description. The equipment is of the horizontal separator type, the construction of which is complex and burdensome, and the feeding system is included within the separator.

Patent application US 2011/186134 A1 discloses a device for splitting a two-phase flux comprising a "T" joint for separating the fluid. The orientation of the feeding line is substantially vertical, and its interior is conformed for inducing a tangential movement of the phases such as the heavier phase is distributed around the periphery of the feeding line.

Use of two steps of two-phase separation or expensive three-phase separators constitute an obstacle for achieving a cost reduction and originate a permanent need for new, low cost, efficient three-phase separation systems which also have a low impact on the environment.

BRIEF DESCRIPTION OF THE INVENTION

The present invention solves the need for a low cost three-phase separation and measuring device which reduces control times, is easy to operate and which performs reliable measurements, a need specially present in mature oil reservoirs, Furthermore, the present invention solves such needs by means of vertical two-phase separators, which are among the elements more often used in the oil industry, without having to invest large amounts of money in horizontal three-phase separators.

As it is well known in the art, when oil reservoirs approach completion, two phase separators are no longer suitable and fall into disuse. The present invention allows prolonging their lifespan, utilizing them in reservoirs near depletion, transforming said two-phase vertical separators into three-phase vertical separators, so as to streamline well control operations, and eliminate control tanks and errors associated with measurements.

It is an object of the present invention to provide a three-phase vertical separator device for separating a three-phase fluid into the corresponding gas, oil and water phases, comprising:
 i. a vertical separator which comprises:
    a. a first fluid inlet on its upper portion, and a second fluid inlet on its middle portion; and
    b. a first fluid outlet line for the gas phase in the upper part of said separator, above said first fluid inlet; a second fluid outlet line for the oil phase in the middle portion of said separator, above said second fluid inlet, and a third fluid outlet line for the water phase in the bottom portion of said separator; and
 ii. a horizontal fluid feed line that splits into two lines prior to entering the vertical separator by means of a "T" joint, thereby forming a first vertical ascending feed line and a second vertical descending feed line;
    wherein the first vertical ascending fluid feed line is connected to said first fluid inlet of the vertical separator and wherein said second vertical descending fluid feed line is connected to said second fluid inlet of the vertical separator.

In a preferred embodiment of the present invention, the device further comprises:
 i. a water phase discharge valve, located on the third fluid outlet line for the water phase;
 ii. an oil phase discharge valve, located on the second fluid outlet line for the oil phase,
 iii. an interfase level sensor of the floater type with a ballast, referred to hereinafter as the interfase floater sensor, located approximately in the middle portion of the vertical separator; and iv. a high level sensor of the floater type, referred to hereinafter as the high level floater sensor, located in the vertical separator at the maximum desired level for all liquid phases inside the vertical separator;

wherein the interfase level sensor is connected to and controls the opening and closing of the water phase discharge valve and where the high level sensor is connected to and controls the opening and closing of the oil phase discharge valve.

In a preferred embodiment of the present invention, the device further comprises a positive displacement flow meter on the second fluid outlet line for the oil phase.

In a preferred embodiment of the present invention, the device further comprises a magneto-inductive sensor on the third fluid outlet line for the water phase.

It is another object of the present invention to provide a method for separating a three-phase fluid into the corresponding gas, oil and water phases, comprising:

i. separating a horizontal three-phase fluid feed flow into two fluid flows, a first vertical ascending fluid flow and a second vertical descending fluid flow, by means of a pipe bifurcation using a "T" joint;
ii. directing said first vertical ascending flow to enter the upper portion of a vertical separator, and directing said second vertical descending fluid flow to enter the middle portion of said separator, producing thereby the separation of said three-phase fluid into its respective gas, oil and water phases within the vertical separator; and
iii. extracting the gas phase from the upper portion of said vertical separator, extracting the oil phase from the middle portion of said vertical separator, and extracting said water phase from the bottom portion of said vertical separator by means of respective fluid outlet lines.

In a preferred embodiment of the present invention, the method further comprises:

i. detecting the level of the oil-water interfase inside the vertical separator by means of a first interfase level sensor of the floater type with a ballast;
ii. controlling the water phase extraction by opening or closing a water phase discharge valve depending on the level of the oil-water interface measured by said oil-water interfase level sensor;
iii. detecting the maximum level of all liquid phases inside the vertical separator by means of a second level sensor of the floater type; and
iv. controlling the oil phase extraction by opening or closing an oil phase discharge valve depending on the level of the liquid phase measured by said second level sensor.

In a preferred embodiment of the present invention, the method further comprises measuring the oil phase output flow by means of a positive displacement flow meter.

In a preferred embodiment of the present invention, the method further comprises measuring the water phase output flow by means of a magneto-inductive sensor.

In a preferred embodiment of the present invention, the method further comprises determining the amount of oil in water in the water phase output by means of a colorimetric analysis.

In a preferred embodiment of the present invention, the method further comprises determining the amount of water in oil in the oil phase output by means of centrifugation.

It is yet another object if the preset invention to provide a method for converting a two-phase vertical separator into a three-phase vertical separator, comprising:

i. providing a two-phase vertical separator, which comprises a separator body; a three-phase fluid horizontal feed line entering said separator through a first fluid inlet in the middle portion thereof; a gas phase outlet with a corresponding relief valve; a liquid phase output line, controlled by a liquid phase discharge valve; and a liquid phase level sensor of the floater type which controls the level of the liquid phase and commands the opening and closing of said discharge valve, depending on the level of the liquid phase;
ii. disconnecting said three-phase fluid horizontal feed line, and providing the same, in proximity to the vertical separator, with a "T" joint for splitting said three-phase fluid horizontal feed line into a first vertical ascending fluid feed line and a second vertical descending fluid feed line;
iii. providing said vertical separator with a second fluid inlet on the upper portion thereof; connecting said first vertical ascending fluid feed line to said second fluid inlet of the vertical separator; and connecting the second vertical descending fluid feed line to said first fluid inlet of the vertical separator;
iv. providing said liquid phase level sensor of the floater type with a ballast, thereby converting said sensor into an oil-water interfase sensor, and measuring the level of the oil-water interfase by means thereof;
v. discharging fluid from the water phase by means of said liquid phase discharge valve, so that the same opens when said oil-water interfase sensor registers a high level of the water phase, and closes when said sensor registers a low level of water phase;
vi. providing the vertical separator with a level sensor of the floater type, at a maximum desired level for all liquid phases inside the separator, for controlling the level thereof;
vii. providing the vertical separator with an oil phase fluid outlet, slightly below the level of said liquid phase level sensor, which outlet further comprises an oil phase discharge valve; and
viii. connecting said liquid phase level sensor to said oil phase discharge valve, so that the same opens when the sensor registers a high level of all liquid phases inside the separator, thus discharging fluid from the oil phase, and closing when said sensor registers a low level of all liquid phases inside the separator.

In a preferred embodiment of the present invention, the method further comprises providing with an elbow the terminal end of the second vertical descending fluid feed line, inside the vertical separator.

In a preferred embodiment of the present invention, the method further comprises providing with a perforated tube the terminal end of the first vertical ascending fluid feed line, inside the vertical separator.

In a preferred embodiment of the present invention, the method further comprises providing with a magneto-inductive sensor said water phase outlet.

In a preferred embodiment of the present invention, the method further comprises providing with a positive displacement flow meter said oil phase outlet.

The device and methods of the present invention provides vertical separator with a very low investment relating to equipment and assembly costs, since it allows the re-use or recycle at the original location of equipment that would otherwise be decommissioned.

Likewise, de device of the present invention features a dynamic operation since its use, restart, calibration, repair, and disassembling are easy. Its operation is stable, without the need for further adjustments once calibrated, its maintenance cost is low and it is versatile, adaptable for a wide range of liquid flows, depending on the capacity of the vessel. It is suitable for use on reservoirs with low GOR (gas oil ratio) and high water cuts of the type encountered on mature reservoirs.

DETAILED DESCRIPTION OF THE INVENTION

The device and methods of the present invention are further described in detail with reference to the accompanying figures.

Figure 1:
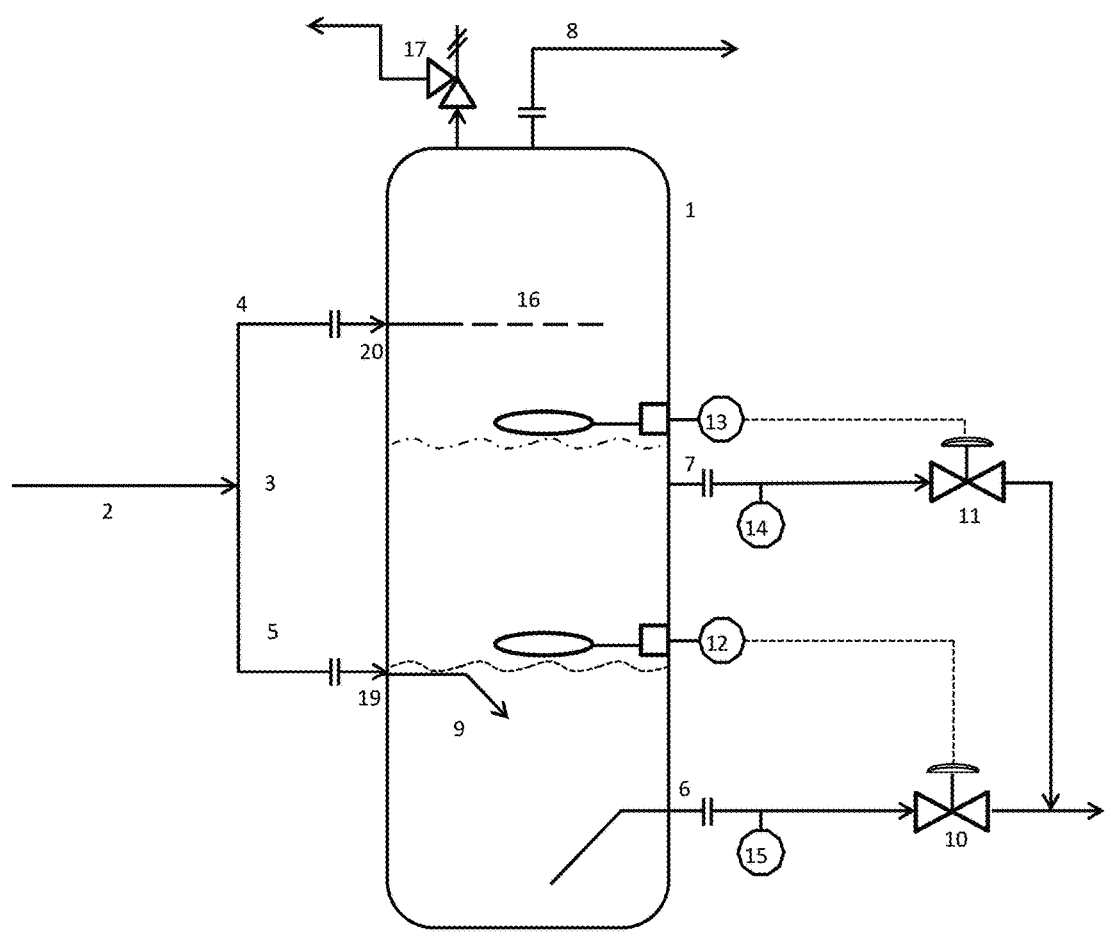
FIG. 1 shows a schematic view of the separator device for three-phase fluid according to a preferred embodiment of the present invention.

The separator device for three-phase fluids of the present invention, as shown in FIG. 1, comprises a vertical separator 1 for separating a three-phase feed fluid into its corresponding gas, oil and water phases, allowing for the extraction of the corresponding fluids from each one of said phases.

The three-phase feed fluid to be separated comes from a horizontal three-phase fluid feed line 2. Said horizontal three-phase fluid feed line 2, in proximity to the vertical separator 1, comprises a "T" joint 3, which divides the three-phase fluid feed flow into a first vertical ascending fluid flow feed line 4 and a second vertical descending fluid flow feed line 5. The first vertical ascending feed line 4 is connected in its upper portion to the vertical separator 1 by an inlet 20, while the second vertical descending feed line 5 is connected to the vertical separator 1 by an inlet 19 in its middle portion. This division or split into two vertical flow feed lines, one ascending 4 and the other descending 5, produces a degassing by gravity in the three-phase feed fluid, diverting a gas phase towards the upper portion of the vertical separator 1, and diverting a liquid phase towards the oil-water interfase portion of the vertical separator 1. This derivation of the gas phase provides a relatively smooth entry of the liquid to the vertical separator 1, thereby preventing the creation of gas pockets. Within the vertical separator 1, the vertical descending feed line 5, in a preferred embodiment of the invention, comprises an elbow 9 on its terminal end. Said elbow 9 produces a vortex in the fluid which improves the efficiency of the phase separation.

Additionally, within the vertical separator 1, the vertical ascending feed line 4, mainly a gas phase, comprises a perforated tube 16 on its terminal end, which helps to obtain a uniform fluid distribution in the entire area of the separator.

On the side of the separator opposite to said inlets for both ascending 4 and descending 5 flows, the vertical separator 1 comprises three fluid outlets, each one being designed for the extraction of fluid from each of the phases respectively. These fluid outlets are a water phase outlet 6, an oil phase outlet 7 and a gas phase outlet 8. The water phase outlet 6 is located in the lower part of the vertical separator 1, the oil phase outlet 7 is located on the middle part of the vertical separator 1, opposite the "T" joint 3 of the feed line 2, and the gas phase outlet 8 is located on the upper part of the vertical separator 1. On one side of the gas phase outlet 8, the vertical separator 1 comprises a relief valve 17 which protects the device against overpressures.

In a preferred embodiment of the present invention, the inlet 19 of the vertical descending feed line 5 is located on the vertical separator 1 at a height below the oil phase outlet 7. A pair of valves, a water phase discharge valve 10 and an oil phase discharge valve 11, control the extraction of fluid through the water phase outlet 6 and the oil phase outlet 7 respectively. The opening and closing of each valve 10 and 11 are controlled by corresponding level sensors of the floater type 12 and 13.

The first of the level sensors of the floater type, hereby referred to as the interface floater sensor 12, is located approximately in the middle portion of the vertical separator 1, under the oil phase outlet 7 and records the level of the water-oil interface. When said interface floater sensor 12 detects an increase in the water phase in the vertical separator 1, it commands the opening of the water phase discharge valve 10, thereby discharging water phase fluid through the water phase outlet 6 until the level of said water phase inside the vertical separator 1 falls below the level of the interface floater sensor 12. In a preferred embodiment of the invention, this discharge of the water phase is recorded by a magneto-inductive sensor 15. Further analysis to determine the amount of oil in water in the discharge of the water phase may be performed by a colorimetric analysis.

The second level sensor of the floater type, hereby referred to as the high level floater sensor 13, measures the level of the liquid phase, i.e., the combined level of the oil phase and the water phase, and is located in the vertical separator 1 at the maximum desired level for said liquid phase. In a preferred embodiment of the invention, said high level floater sensor 13 is located approximately on the upper third portion of the vertical separator 1. When said high level floater sensor 13 registers an increase in the oil phase in the vertical separator 1, it sends a signal to open the oil phase discharge valve 11, thereby discharging fluid of said oil phase through the oil phase outlet 7 until the level of said phase inside the vertical separator 1 falls below a minimum level. In a preferred embodiment of the present invention, this discharge of oil phase is registered by a positive displacement flow meter 14. Further analysis to determine the amount water in oil in the discharge of the oil phase may be performed by centrifugation.

In a preferred embodiment of the present invention, the horizontal three-phase fluid feed line 2, as well as the ascending 4 and descending 5 flow feed lines consist of 4" pipes, the water phase outlet 6 is 4" in diameter and the oil phase outlet 7 is 2" in diameter.

Table 1 shows, by way of an example, an average operating scheme of a preferred embodiment of the device of the present invention, along with the resulting measurements.

TABLE 1 device of the present invention during an example operation scheme.

| PRODUCTION PARAMETERS DURING OPERATION | |
|---|---|
| Feed flow (m$^3$/day) | 300 |
| Water cut (%) | 97 |
| Work pressure (Kg/cm$^2$) | 2.5 |
| Work temperature (° C.) | 60 |
| GOR (Gas Oil Ratio) (m$^3$/m$^3$) | 50 |
| Oil density (g/cm$^3$) | 0.8795 |
| Water density (g/cm$^3$) | 1.03 |

TABLE 1-continued device of the present invention during
an example operation scheme.

| OBTAINED PRODUCTS | |
| --- | --- |
| Clean water | 300 ppm of hydrocarbon in water |
| Oil | 1 to 3% of water in oil phase |
| Dry gas (clean) | 450 std m$^3$/day |

Figure 2:
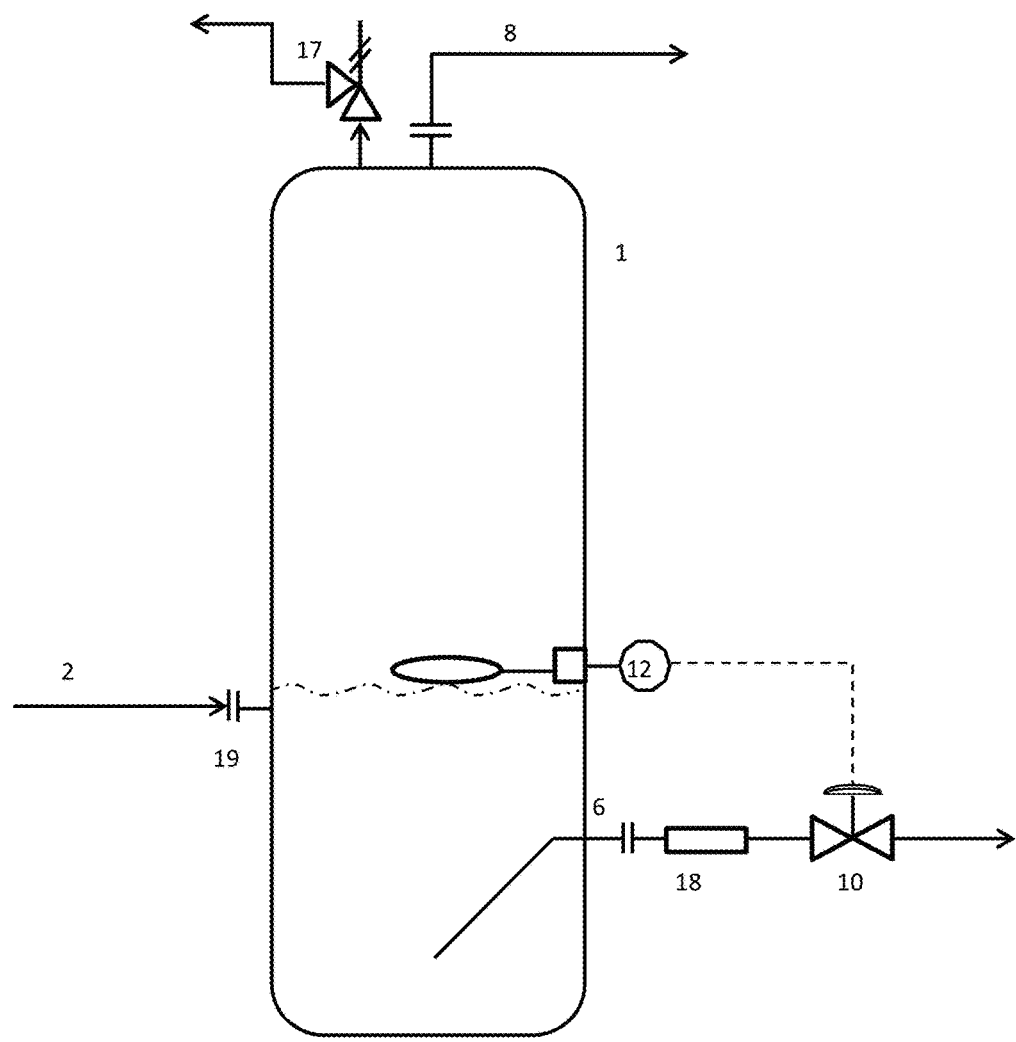
FIG. 2 shows a schematic view of a separator device for a two-phase fluid prior to its conversion into a separator device for a three-phase fluid by means of the method of the present invention.

The present invention further provides a method for converting a vertical two-phase fluid separator device into a three-phase vertical fluid separator device as described above. FIG. 2 shows, by way of a non-limiting example, a two-phase vertical separator, series model S-150 on which a preferred embodiment of the method of the present invention is carried out. Said two-phase separator comprises a separator body 1, a 4" three-phase fluid feed line 2 entering said separator through and inlet 19, a gas phase outlet 8 with a corresponding relief valve 17 and a 4" liquid phase discharge pipeline 6, controlled by a liquid phase discharge valve 10. Inside the separator 1, the three-phase fluid feed line 2 comprises an elbow 9 in its terminal end.

A liquid phase level sensor of the floater type 12 regulates the level of the liquid phase and commands the opening of the liquid phase discharge valve 10 when said phase reaches a maximum level. A mass sensor 18 in said discharge line registers the fluid discharge. The method of the present invention is thus applied to this vertical two-phase fluid separator in order to convert it into a three-phase vertical separator.

For this purpose, said three-phase fluid feed line 2, on a horizontal portion of the same near the entrance to the vertical separator 1, is provided with a "T" joint 3. Said "T" joint 3 divides said three-phase fluid feed line into a first vertical ascending fluid flow feed line and a second vertical descending fluid flow feed line 5. Then, said first vertical ascending fluid flow feed line 4 is connected to the vertical separator 1 by its upper portion, using a new inlet 20, and said second vertical descending fluid flow feed line 5 is connected to the middle portion of the vertical separator 1 using the original existing fluid inlet 19.

The liquid phase outlet line of the original two-phase separator is used in this case as the water phase outlet 6 in the three-phase separator. For this purpose, the original level sensor of the floater type 12, now referred to as the interfase floater sensor 12, with an added small ballast (not shown) is used to measure the level of the oil-water interface. Said interfase floater sensor 12 is connected to said liquid phase discharge valve 10, now acting a water phase discharge valve, so that such valve is opened when the sensor registers a high level of the water phase. When the interfase floater sensor 12 registers a maximum level of the water phase, it commands the water phase discharge valve 10 to discharge the fluid until the level of the same falls below said maximum level.

Then, the vertical separator is provided with a second level sensor of the floater type, the high level floater sensor 13, located at the maximum desired level for the liquid phase, to register the maximum level of said liquid phase.

The separator 1 is provided with a new outlet 7 located slightly below the height of said high level floater sensor 13, acting as the oil phase fluid outlet 7, which is further provided with an oil phase discharge valve 11. Said oil phase discharge valve 11 is connected to said high level floater sensor 13, so that valve opens when the sensor registers a high level of liquid phase, therefore discharging fluid from the oil phase, and the valve closes when the sensor registers a low liquid phase level.

Finally, in order to improve the efficiency of the device, it is provided with an elbow 9 within the vertical separator 1, which may or may not exist in the original two-phase separator, to the terminal end of the vertical descending fluid flow feed line 5, which elbow creates vortexes in the fluid, improving separation.

Additionally, within the vertical separator 1, the device is provided with a perforated tube 16 to the terminal end of the vertical ascending fluid flow feed line 4, in order to obtain a uniform distribution of the incoming fluid.

As shown, the modified separator utilizes most of the original existing connections and components, so as to reduce the costs of the modification.

Those skilled in the art will recognize, or be able to determine, using only routine experimentation, many equivalents to the specific procedures, embodiments, claims and examples described herein. Such equivalents are considered to be within the scope of the present invention and covered by the appended claims.

The invention claimed is:

1. A vertical three-phase separator device for separating a three-phase fluid into corresponding gas, oil and water phases, comprising:
   i) a vertical separator which comprises:
      a) a first fluid inlet on its upper portion, and a second fluid inlet on its middle portion; and
      b) a first fluid outlet line for the gas phase in the upper part of said separator, above said first fluid inlet; a second fluid outlet line for the oil phase in the middle portion of said separator, above said second fluid inlet, and a third fluid outlet line for the water phase in the bottom portion of said separator; and
   ii) a horizontal fluid feed line that splits into two lines prior to entering the vertical separator by means of a "T" joint, thereby forming a first vertical ascending feed line and a second vertical descending feed line;
   wherein the first vertical ascending fluid feed line is connected to said first fluid inlet of the vertical separator and wherein said second vertical descending fluid feed line is connected to said second fluid inlet of the vertical separator.

2. The device according to claim 1, wherein the device further comprises:
   i) a water phase discharge valve, located on the third fluid outlet line for the water phase;
   ii) an oil phase discharge valve, located on the second fluid outlet line for the oil phase,
   iii) an interfase level sensor of the floater type with a ballast, located approximately in the middle portion of the vertical separator; and
   iv) a high level sensor of the floater type located in the vertical separator at the maximum desired level for all liquid phases inside the vertical separator;
   wherein the interfase level sensor is connected to and controls the opening and closing of the water phase discharge valve and where the high level sensor is connected to and controls the opening and closing of the oil phase discharge valve.

3. The device according to claim 2, wherein the device further comprises a positive displacement flow meter on the second fluid outlet line for the oil phase.

4. The device according to claim 2, wherein the device further comprises a magneto-inductive sensor on the third fluid outlet line for the water phase.

5. A method for separating a three-phase fluid into corresponding gas, oil and water phases, comprising:
   i) separating a horizontal three-phase fluid feed flow into two fluid flows, a first vertical ascending fluid flow and a second vertical descending fluid flow, by means of a pipe bifurcation using a "T" joint;
   ii) directing said first vertical ascending flow to enter the upper portion of a vertical separator, and directing said second vertical descending fluid flow to enter the middle portion of said separator, producing thereby within the vertical separator the separation of said three-phase fluid into its respective gas, oil and water phases; and
   iii) extracting the gas phase from the upper portion of said vertical separator, extracting the oil phase from the middle portion of said vertical separator, and extracting said water phase from the bottom portion of said vertical separator by means of respective fluid outlet lines.

6. A method according to claim 5, wherein the method further comprises:
   i) detecting the level of the oil-water interfase inside the vertical separator by means of an interfase level sensor of the floater type with a ballast;
   ii) controlling the water phase extraction by opening or closing a water phase discharge valve depending on the level of the oil-water interfase measured by said interfase level sensor;
   iii) detecting the maximum level of all liquid phases inside the vertical separator by means of a second level sensor of the floater type; and
   iv) controlling the oil phase extraction by opening or closing an oil phase discharge valve depending on the level of all liquid phases inside the vertical separator measured by said second level sensor.

7. A method according to claim 6, wherein the method further comprises measuring the oil phase output flow by means of a positive displacement flow meter.

8. A method according to claim 6, wherein the method further comprises measuring the water phase output flow by means of a magneto-inductive sensor.

9. A method according to claim 6, wherein the method further comprises determining the amount of oil in water in the water phase output by means of a colorimetric analysis.

10. A method according to claim 6, wherein the method further comprises determining the amount of water in oil in the oil phase output by means of centrifugation.

11. A method for converting a two-phase vertical separator into a three-phase vertical separator, comprising:
   i) providing a two-phase vertical separator, which comprises a separator body; a three-phase fluid horizontal feed line entering said separator through a first fluid inlet in the middle portion thereof; a gas phase outlet with a corresponding relief valve; a liquid phase output line, controlled by a liquid phase discharge valve; and a liquid phase level sensor of the floater type which controls the level of the liquid phase and commands the opening and closing of said discharge valve, depending on the level of the liquid phase;
   ii) disconnecting said three-phase fluid horizontal feed line, and providing the same, in proximity to the vertical separator, with a "T" joint for splitting said three-phase fluid horizontal feed line into a first vertical ascending fluid feed line and a second vertical descending fluid feed line;
   iii) providing said vertical separator with a second fluid inlet on the upper portion thereof; connecting said first vertical ascending fluid feed line to said second fluid inlet of the vertical separator; and connecting the second vertical descending fluid feed line to said first fluid inlet of the vertical separator;
   iv) providing said liquid phase level sensor of the floater type with a ballast, thereby converting said sensor into an oil-water interfase sensor;
   v) providing the vertical separator with a level sensor of the floater type, at a maximum desired level for all liquid phases inside the separator, for controlling the level thereof;
   vi) providing the vertical separator with an oil phase fluid outlet, slightly below the level of said liquid phase level sensor, which outlet further comprises an oil phase discharge valve; and
   vii) connecting said liquid phase level sensor to said oil phase discharge valve, so that the same opens when the sensor registers a high level of all liquid phases inside the separator, thus discharging fluid from the oil phase, and closing when said sensor registers a low level of all liquid phases inside the separator.

12. A method according to claim 11, wherein the method further comprises providing with an elbow the terminal end of the second vertical descending fluid feed line, inside the vertical separator.

13. A method according to claim 11, wherein the method further comprises providing with a perforated tube the terminal end of the first vertical ascending fluid feed line, inside the vertical separator.

14. A method according to claim 11, wherein the method further comprises providing with a magneto-inductive sensor said water phase outlet.

15. A method according to claim 11, wherein the method further comprises providing with a positive displacement flow meter said oil phase outlet.

* * * * *